Figure 1:
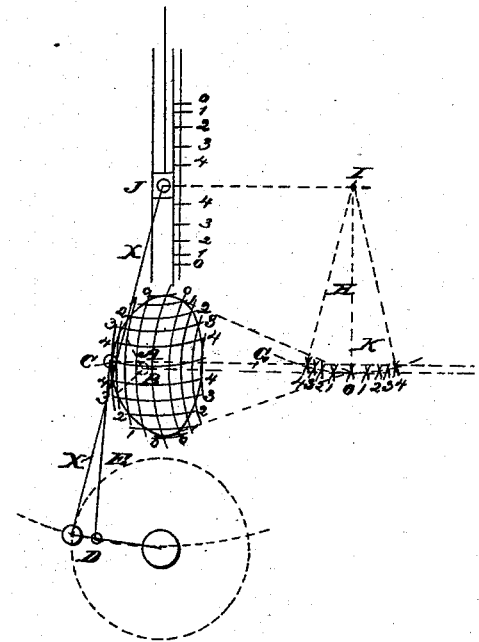

(No Model.)  4 Sheets—Sheet 1.

A. MORTON.
VALVE GEAR FOR STEAM ENGINES.

No. 274,810. Patented Mar. 27, 1883.

Attest:
Wm. J. Tanner
E. C. Buckley

Inventor
Alexander Morton
By Knight Bros.
his Attorneys (No Model.) 4 Sheets—Sheet 2.
A. MORTON.
VALVE GEAR FOR STEAM ENGINES.
No. 274,810. Patented Mar. 27, 1883.
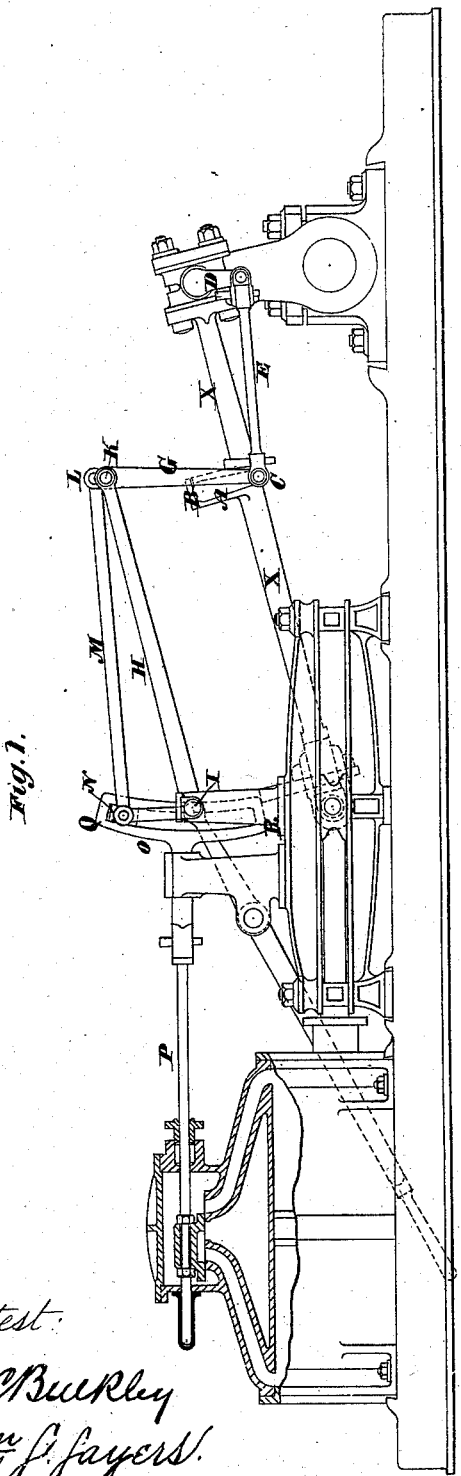
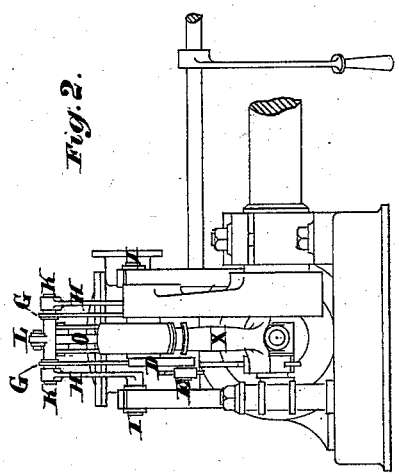

(No Model.)  4 Sheets—Sheet 3.

A. MORTON.
VALVE GEAR FOR STEAM ENGINES.

No. 274,810.  Patented Mar. 27, 1883.

Attest
C C Buckley
Wm J Sayers

Inventor
Alexander Morton
By Knight Bros
attys

N. PETERS, Photo-Lithographer, Washington, D. C.

(No Model.) 4 Sheets—Sheet 4.

A. MORTON.
VALVE GEAR FOR STEAM ENGINES.

No. 274,810. Patented Mar. 27, 1883.

Attest
Wm. J. Danney
C. C. Buckley

Inventor
Alexander Morton
By Knight Bros
his Attorneys

UNITED STATES PATENT OFFICE.

ALEXANDER MORTON, OF GLASGOW, COUNTY OF LANARK, SCOTLAND.

VALVE-GEAR FOR STEAM-ENGINES.

SPECIFICATION forming part of Letters Patent No. 274,810, dated March 27, 1883.

Application filed September 20, 1882. (No model.) Patented in England March 28, 1882, No. 1,490.

*To all whom it may concern:*

Be it known that I, ALEXANDER MORTON, a citizen of the United Kingdom of Great Britain and Ireland, residing at Glasgow, in the county of Lanark, Scotland, have invented Improvements in Valve-Gear for Steam-Engines, of which the following is a specification.

This invention relates to improvements in the mechanism for actuating the distribution or slide valves of steam and other motive-power engines in such a manner that when the piston has traveled equidistant from either end of its stroke the slide-valve may be relatively equidistant from the end of its stroke, and that whether in forward or backward gear or any intermediate position.

The invention has for its object the equal distribution of the steam or other gas to both ends of the cylinder or cylinders of steam or other engines, whether in the position of full or intermediate gear; and it consists, first, of the application and use of a short lever or spanner radiating from a point on the connecting-rod at right angles to and in the direction of its lateral motion, and at any distance between the crank-pin and the cross-head center, or on the crank-pin itself, but by preference about half-way from the end of the connecting-rod. From a stud or center at the other end of the said short lever or spanner a link is connected to an overhung crank or eccentric on the crank-pin. The stroke of the aforesaid link should be so much less, and proportionably so, than that of the engine and in the same direction, that the said stud or center may describe an elliptical figure whose major and minor diameters are segments of circles of equal or nearly equal length at equidistant points from the center of the said figure, and that whether the connecting-rod be long or short in relation to the stroke of the engine; and the improved means for guiding the aforesaid radiating stud or center so that it may describe a regular elliptical figure in contradistinction to a fixed stud or center on the connecting-rod, which describes an irregular elliptical figure, constitutes the first part of the said invention.

The second part of the invention consists in the application and use of a simple lever one end of which may be jointed directly onto the radiating stud or center described in the first part of the invention, and at a point near to its other end it may be jointed to a link vibrating from a fixed center, and in such a manner that when the engine may be at the termination of its stroke "on the center" the link may be exactly in the middle of its vibration, a line through its centers being then always parallel to a line through the centers of the engine. The distance between the two centers of the said simple lever may be determined by the radius of the major axis of the elliptical figure described under the first part of the invention. The fixed center of the vibrating link may be so placed on the parallel line before referred to that every movement of the piston, measured from either end of its stroke, may give a proportionably exact vibration to the aforesaid link from the middle of its vibration. A fixed slide curved to the same radius as the vibrating link would give similar results; but the link vibrating from a fixed center is preferred; and the improved means for obtaining the equality of vibration, and that through a radius equal to the length of the link, constitutes the second part of this invention.

The third part of the invention consists in the application and use of a link one end of which may be capable of adjustment in a curved slot or on a curved bar whose radius may be equal to the length of the link, for the purpose of actuating and reversing the distribution or slide valves of steam and other motive-power engines. The curved slot or bar may form a part of the slide-valve rod, or be fixed thereto in such a manner that a sliding block curved to fit may travel equally on both sides of the rod and carry with it the adjustable end of the actuating-link. The other end of the said actuating-link may be jointed to the simple lever described under the second part of the invention at a point near to that where it joins and works the link vibrating from a fixed center, also described under the second part of the invention, so that the combined motion of this third point in the simple lever may, through the intervention of the actuating-link and curved slot or bar, be communicated to the slide-valve rod or to the slide-valve itself in such a manner that when the said sliding block may be shifted from right to left from the center of its travel the engine may be reversed, and whether shifted to the right or left of the center, so that the distribution of steam in steam-engines may be equal alternately on both sides of the piston.

And in order that my said invention may be fully understood, I shall now proceed more particularly to describe the same, and for that purpose I shall afterward refer to the several figures on the four sheets of drawings hereunto annexed, the same letters of reference indicating corresponding parts in all the figures.

It is well known that a fixed point on the line of the connecting-rod of all reciprocating engines describes the path of an elliptical figure which somewhat resembles the contour of an egg, the larger end being nearest to the crank, and should the connecting-rod be very short in relation to the stroke of the engine its lateral motion during the inner half may be much less than that produced during the outer half of the stroke. Consequently the path described by a fixed point becomes a very irregular elliptical figure.

My invention consists, first, in the improved means for actuating a movable point or center so adjusted that in an engine such as is indicated by the diagram Figure 1, Sheet 1, the said movable point or center shall travel, relatively to the connecting-rod, toward the crank during the inner stroke and from the crank during the outer stroke, thus producing the path of an elliptical figure whose minor ordinates are or may be equal when measured from the center of the figure. If the said movable point or center be moved exactly along the center line of the connecting-rod, the major axis of the figure becomes a straight line; but the improvements under the first part of my said invention consist chiefly in the means employed for actuating the said movable point or center so that it may radiate on or equally across the center line of the connecting-rod, and thus describe the path of an elliptical figure whose major axis becomes a segment of a circle, as represented on Fig. 1, Sheet 1, and where the major and minor ordinates intersect each other at 1 2 3 4 and 1' 2' 3' 4', from either end of the figure, they form the elliptical path. The connecting-rod X in this diagram is represented to be of a length twice that of the stroke of the engine, and the short lever or spanner A to radiate from a point, B, on a projection on the connecting-rod at about one-half the length of the latter. The radiating movable point or center C is actuated from an overhung crank, D, (on the main crank-pin of the engine,) through the link E. The movable point or center C describes an elliptical path whose minor ordinates are equal, or nearly so, when measured at equidistant points from the minor axis or center of the figure, and when the major axis is about three-fourths of the stroke of the engine. With any practical length of connecting-rod, and with the point or center C radiating across the center line in any point in the length of the said rod, if the major axis of the path described be too short the minor ordinates will be greatest during the latter half of the inner stroke, and vice versa if the major axis be too long—a mean producing the required regular figure—that is to say, the nearer the radiating point C is brought to the crank end of the connecting-rod the longer the overhanging crank D must be made, and vice versa.

The improvements under the second part of my invention are also indicated by the diagram Fig. 1, Sheet 1, and consist in connecting one end of a simple lever, G, with the radiating point or center C, so that that end may follow the said point C through the elliptical path, and at a radius equal to that of the major axis the lever G is connected with a link, H, vibrating from a fixed center, I, so that the link H is always parallel with the connecting-rod X, and consequently always in the middle of its vibration when the engine is at the termination of its stroke on the center, and for every equidistant movement of the cross-head J in either forward or backward gear the said link H may give an exactly proportionate vibration to the right or left of the center, as shown by the crosses on the arc of the link H, Fig. 1, Sheet 1. It will be understood that if the center K of the simple lever G be disconnected from the vibrating link H, and made to describe a radius from the movable point or center C it will for every movement of the piston-rod form those crosses marked 1 2 3 4 and 1' 2' 3' 4' upon a segment of a circle exactly equal to the radius of the vibrating link H, whether the latter restrain it to follow the segment or not. Should the length of the simple lever G be greater than the radius of the major axis of the elliptical figure, the crosses 1 2 3 4 farther from the engine will be closer together than those nearer the engine, and should the length be less the crosses will be the reverse—a mean producing exact equality, as shown on the diagram Fig. 1, Sheet 1.

Figure 2:
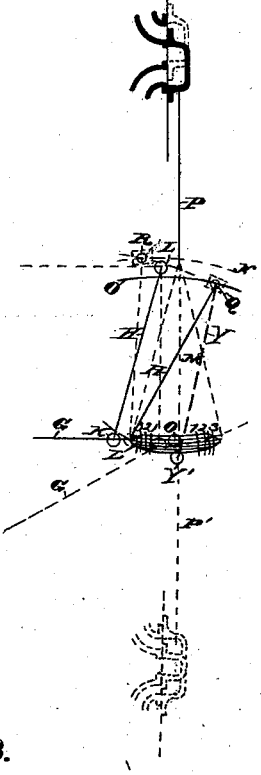

Fig. 2, Sheet 1, represents a diagram of a vertical engine with the first and second parts combined so as to illustrate the third and last part of my said invention. The simple lever G, whose fulcrum K vibrates with the link H, has a short extended center, L, which partakes of two motions, as represented by the elongated elliptical figure shown by the diagram. The link H vibrates from right to left, and carries the fulcrum K of the lever G, whose longer end, being connected with the movable point or center C, must follow the elliptical path shown on diagram Fig. 1, Sheet 1. Consequently the shorter end center, L, must describe an elongated figure whose major axis must agree with the minor axis of the path described by the movable point or center C, and whose minor axis must be a proportional agreeing with the differences of the distances between the fulcrum K and the end centers, C and L. As K C is to K L so is the major axis of the larger path to the minor axis of the smaller path.

The third part of my said invention consists in attaching one end of an adjustable link, M, to the said short extended center L, so that it shall follow the smaller path shown on diagram Fig. 2, Sheet 1, while the other end, N, may be adjusted to the right or left of the center of the curved bar or slot O, which latter is or may be made in one piece with the slide-valve rod P, or be fixed thereto, so as to form the latter T inverted. When in the central position the adjustable end N will travel exactly equal with the minor axis of the smaller elliptical figure or path described by the center L; but when moved to the right, as at Q, the engine is in full gear backward or forward, and when moved to the left, as shown by the dotted lines at R, the engine is in full gear in the reverse direction, and when in any intermediate position the engine will work more or less expansively. When the center N is nearest the center of the curved slot or bar O the expansion is greatest, and when equidistant on either side of the center an equal distribution is given to both ends of the cylinder, whether in forward or backward gear.

Figure 3:
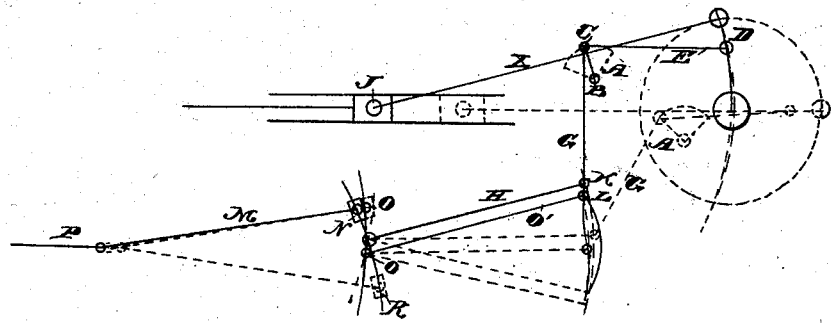
Figure 1:
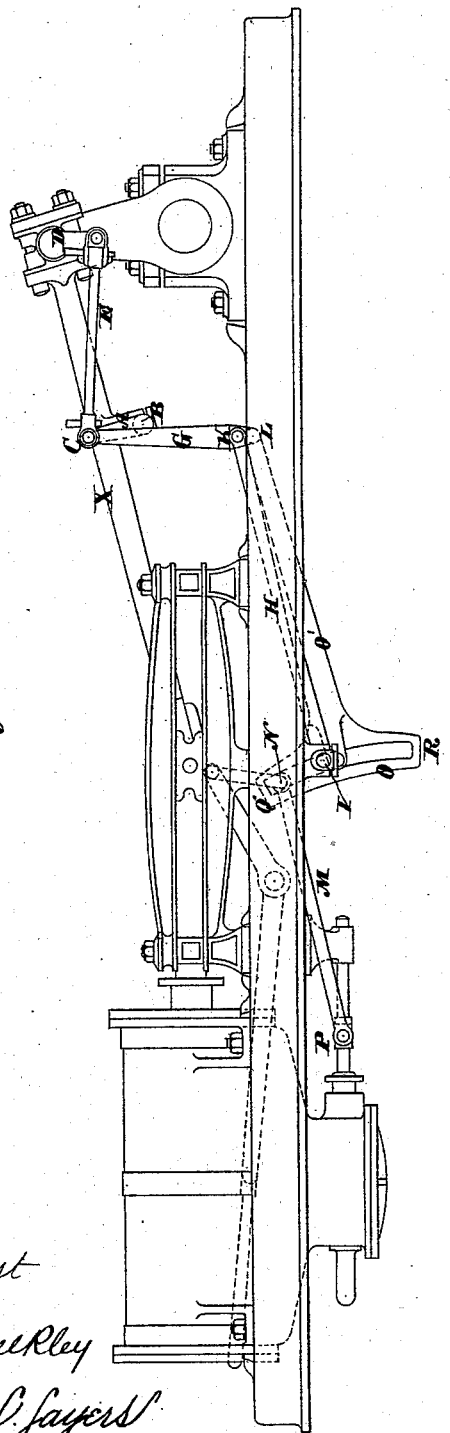
Figure 2:
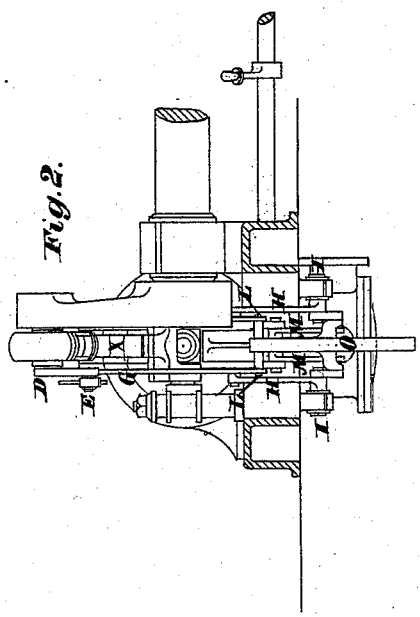
Figure 1:
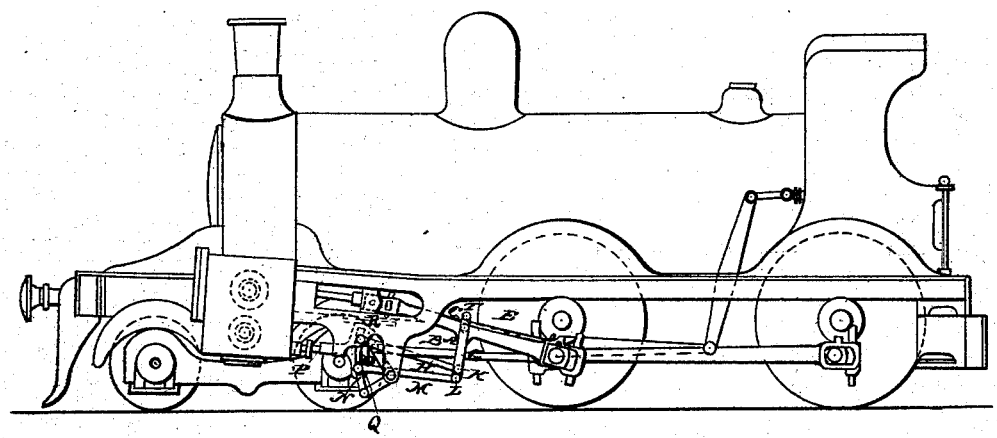

Fig. 3, Sheet 1, represents a diagram of a horizontal engine with the slide-valve below the cylinder; but it will be understood that in any of the modifications it may be at the front or back in vertical engines and above or below in horizontal engines. In this modification the T-piece O vibrates, its longer arm being always parallel with the vibrating link H, and the adjustable link M connects the rocking head of the T with the slide-valve rod P. To reverse the engine the center N must be moved from Q to R in a similar manner to that just described.

Figs. 1 and 2, Sheet 2, represent side and end elevations of an ordinary horizontal reversing-engine with the three parts of my invention combined and applied. The slide-valve is above the cylinder, and, being a single crank engine, I prefer the movable stud or center C to be actuated by the overhung crank D through the intervention of the link E, as indicated by diagram Fig. 1, Sheet 1, where the same letters of reference indicate corresponding parts.

Figs. 1 and 2, Sheet 3, represent side and end views of an engine similar to that just described, but with the slide-valve below and with the oscillating T-piece gear, as indicated by diagram Fig. 3, Sheet 1, and as the drawings clearly show the several parts, further description is unnecessary, as any person conversant with valve-gear will have no difficulty in following out all the details.

Fig. 1, Sheet 4, represents so much of an elevation as is sufficient to illustrate the application of my improvements to outside-cylinder locomotive-engines. The slide-valves are below the cylinders, and, being single-crank engines, the radiating stud or center C is actuated by an overhung crank, D, as indicated by diagram Fig. 1, Sheet 1; but in order to get the slide-valve rod P close to the cylinder the radiating spanner A is or may be extended to T, where the longer end of the simple lever G is connected; but it is preferred to make a cranked projection on the link E beyond its center and extending to the said point T, instead of at the movable point or center C, as in all the modifications previously described.

It is to be understood that in all the arrangements hereinbefore described the center L, on the lever G, may be within the center K instead of without, as is shown. The reversing may be effected by hand, screw, governor, or any of the well-known hydraulic or other cylinders.

I am aware that slide-valves of motive-power engines have been operated and regulated by means of a lever pivoted to the rod of the slide-valve at one end and to the cross-head at the other, the said lever also being connected to the ordinary slotted link, which link is centrally pivoted and mounted on a trunnion of the engines and controlled by a lever or levers connected to the driving-shaft, and I therefore do not claim this, broadly.

What I desire to secure by Letters Patent is—

1. In a steam or other motive-power engine, the combination of mechanism consisting of the short lever or spanner A, centered at one end, B, on a projection on the connecting-rod X, and having a radiating or movable end, C, attached to an overhung crank, D, by a link, E, and to the valve-rod P by a simple lever or levers, G, connecting-links H M, a slide-block, N, and slot or curved bar O, whereby an equal distribution of steam or other gas to both ends of the cylinder or cylinders is effected, whether in full or intermediate gear, substantially as hereinbefore described.

2. In a steam or other motive-power engine, the combination of apparatus consisting of the short lever or spanner A, centered at one end on a projection on the connecting-rod X, and having a radiating or movable end, C, connected by a link, E, to an overhung crank, D, and by a simple lever, G, to a link, H, and to a curved bar or slot, O, which latter so vibrates that its longer arm O' is always parallel or approximately parallel with the link H, the rocking head of the said T-piece being also connected to the valve-rod P by a link, M, whereby an equal distribution of steam or other gas to both ends of the cylinder or cylinders is effected, whether in full or intermediate gear, substantially as hereinbefore described.

In testimony whereof I have hereunto set my hand and seal this 2d day of September, 1882.

ALEXR. MORTON. [L. S.]

In presence of—
GEO. MACAULAY-CRUIKSHANK,
J. J. H. CRUIKSHANK,
    *Both of* 135 *Buchanan St., Glasgow.*